United States Patent
Hodge et al.

(10) Patent No.: US 7,326,503 B2
(45) Date of Patent: Feb. 5, 2008

(54) PROCESS FOR COLOR FILTER ARRAY RESIDUAL PIGMENT REMOVAL

(75) Inventors: Earnest Hodge, Meridian, ID (US); Brent A. McClure, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 165 days.

(21) Appl. No.: 11/207,814

(22) Filed: Aug. 22, 2005

(65) Prior Publication Data
US 2007/0042278 A1 Feb. 22, 2007

(51) Int. Cl.
*G02B 5/20* (2006.01)
(52) U.S. Cl. ............................ 430/7; 134/1.1
(58) Field of Classification Search ............ None
See application file for complete search history.

(56) References Cited

U.S. PATENT DOCUMENTS 5,482,803 A * 1/1996 Ishiwata et al. ............... 430/7
6,582,988 B1 6/2003 Hsiao et al.
6,951,772 B2 10/2005 Lecohier et al.
2003/0141564 A1* 7/2003 Kondo et al. ............... 257/442
2004/0185598 A1 9/2004 Lecohier et al.

FOREIGN PATENT DOCUMENTS

JP 63-298242 A * 12/1988

* cited by examiner

*Primary Examiner*—John A. McPherson
(74) *Attorney, Agent, or Firm*—Dickstein Shapiro LLP

(57) ABSTRACT

A method of fabricating a color filter array including the removal of unwanted residual color pigments. A substrate is coated with a colored photoresist layer. The photoresist layer is patterned. The substrate is then cured. A descumming step is performed after the curing step to remove the residual pigments without causing significant damage to the remaining color filter array pattern. In another embodiment, the descumming process may be used to control or manipulate the thickness of the color filter array. In another embodiment, the descumming process may be used to modify the surface of the color filter array to be more desirable for the formation of microlenses or other layers over the color filter array.

22 Claims, 4 Drawing Sheets

= RED

= BLUE

☐ = RED

☐ = BLUE

PROCESS FOR COLOR FILTER ARRAY RESIDUAL PIGMENT REMOVAL

FIELD OF THE INVENTION

The invention relates to the fabrication of color filter arrays for solid state imager and display systems.

BACKGROUND OF THE INVENTION

Solid state imagers, including charge coupled devices (CCD) and CMOS sensors, are commonly used in photo-imaging applications. A solid state imager includes a focal plane array of pixels. Each of the pixels includes a photo-sensor device for converting light energy to electrical signals. The photosensor device can be a photogate, photoconductor, a photodiode or other solid state device having a doped region for accumulating photo-generated charge.

Color filter arrays are commonly placed over imager pixel arrays and may also be used in display devices over light emitting elements. In an imager, the color filter arrays are used to filter light of specific wavelengths into the initial charge accumulation region, for example. Color filter arrays are commonly arranged in a mosaic sequential pattern of red, green, and blue filters known as a Bayer filter pattern. The Bayer filter pattern is a quartet ordered with successive rows that alternate (a) red and green, then (b) green and blue filters. Thus, each red filter is surrounded by four green and four blue filters, while each blue filter is surrounded by four red and four green filters. In contrast, each green filter is surrounded by two red, four green, and two blue filters. The heavy emphasis placed upon green filters is due to human visual response, which reaches a maximum sensitivity in the 550-nanometer (green) wavelength region of the visible spectrum.

Conventional technology fabricates color filter arrays using evaporated colorants which do not involve any receiving polymer. To fabricate such color filter arrays over image sensors, the following typical process is used: A photoresist containing a colorant, generally a pigment, is deposited on a semiconductor substrate. The pigmented photoresist is patterned, leaving color pigment over the pixels. A photo develop puddle process is performed such that the pigment and photoresist is removed, but color pigment residue is left behind in the non-patterned areas, interfering with subsequent color filter array levels and degrading the overall image performance. FIG. 1 illustrates a Bayer pattern color filter array in plan view at one stage of processing according to the prior art. Red pigments 5 and blue pigments 6 have been deposited. In FIG. 1, green pigments have not yet been deposited; however, in accordance with the Bayer pattern, the green pigments are to be deposited in green regions 7. Blue pigments 6 remain in green regions 7 after the blue etch process, which is undesirable.

Differing photo develop puddle processes may be used to remove these residual pigments. However, puddle develop processes can cause serious degradation of the desired photo-developed pattern. In addition, puddle develop processes are affected by the topology of the existing substrate, the pattern of the color filter array, and spin effects from other steps of the color filter array processing.

Therefore, a process for cleaning the residual pigments from the color filter array resist levels without damaging the color filter array and that is independent of topology, pattern, and spin effects is desirable.

BRIEF SUMMARY OF THE INVENTION

The invention provides a method of fabricating a color filter array which incorporates acts resulting in the removal of unwanted residual color pigments. A substrate is coated with a photoresist containing a colorant. The photoresist layer is patterned and exposed resist is removed using a develop process. The substrate is then cured. A descumming step is performed after the curing step to remove the residual pigments without causing significant damage to the remaining color filter array pattern. The descumming process may also be used to control or manipulate the thickness of the color filter array or to modify the surface of the color filter array to be more desirable for the formation of microlenses or other layers over the color filter array.

BRIEF DESCRIPTION OF THE DRAWINGS

The foregoing and other advantages and features of the invention will become more apparent from the detailed description of the exemplary embodiments provided below with reference to the accompanying drawings, in which.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

The term "pixel" as used herein, refers to a photo-element unit cell containing a photosensor device and associated structures for converting photons to an electrical signal. In addition, while the invention is described with reference to a semiconductor-based imager, such as a CCD or a CMOS imager, it should be appreciated that the invention may be applied in any micro-electronic or micro-optical device that requires high quality color filter arrays for optimized performance. Additional exemplary micro-optical devices which can employ the invention include other solid state imaging devices, and display devices where a pixel has a device which emits light.

Figure 1:
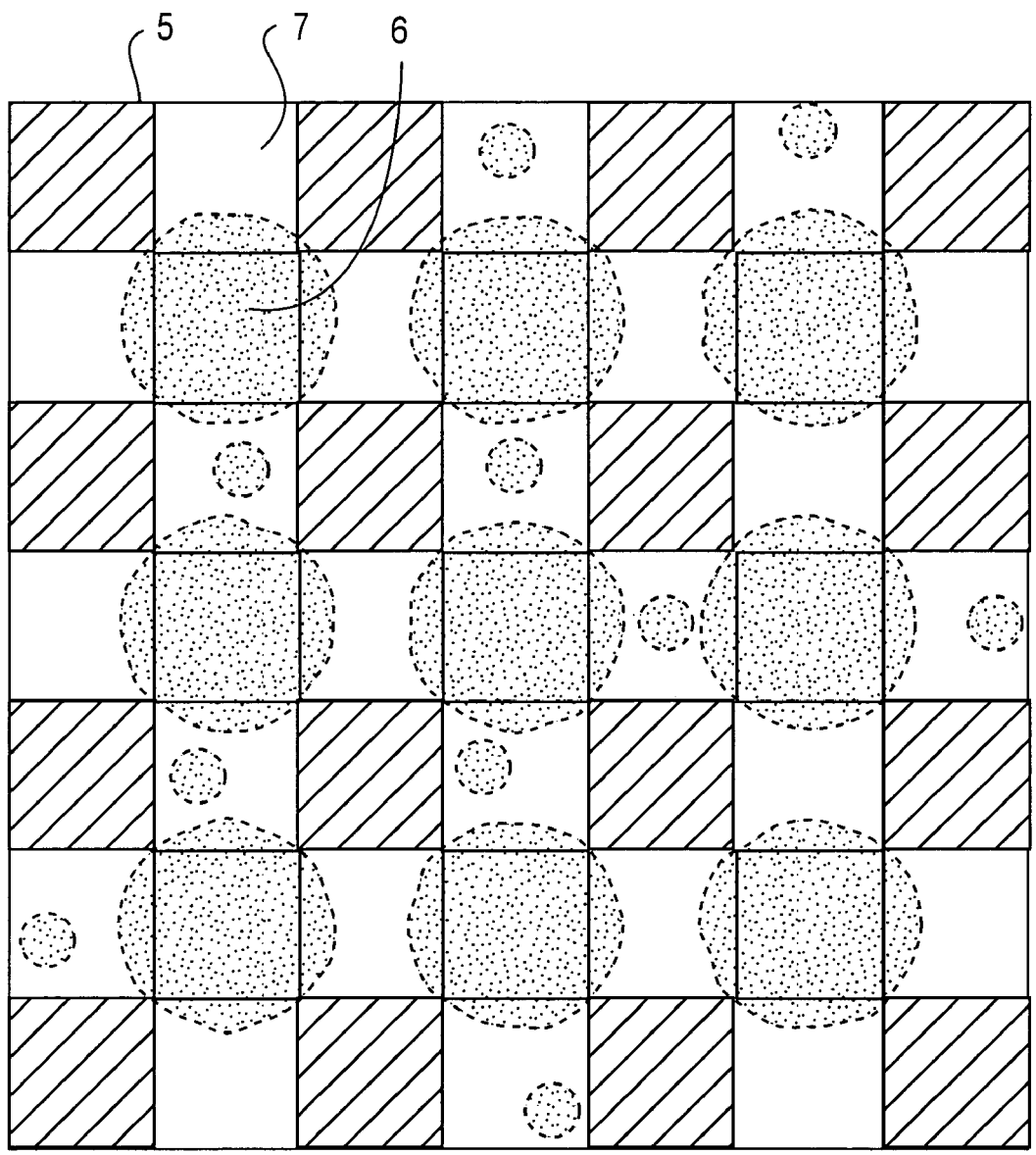
FIG. 1 is an illustration of a color filter array according to the prior art.
Figure 1:
Figure 1:

Referring now to the drawings, where like elements are designated by like reference numerals, FIG. 1 illustrates a Bayer pattern color filter array in plan view at one stage of processing according to the prior art. Photoresist containing red pigments 5 and photoresist containing blue pigments 6 have been deposited and the substrate cured, or baked.

Photoresist containing green pigments have not been deposited, however, in accordance with the Bayer pattern, the photoresist containing green pigments are to be deposited in green regions 7. Photoresist containing blue pigments 6 remain in green regions 7 after the blue photo process. In a process according to the prior art, the next step would be to deposit the photoresist containing green pigments in green regions 7 over the blue pigments 6. This is not desirable since depositing the photoresist containing green pigments directly over the photoresist containing blue pigments 6 compromises the quality of the color filtering of the imaging device.

Typically, the filter and substrate may be cured, or baked, at temperatures of approximately 150° C. to approximately 250° C. The filter may be cured at lower temperatures, however this will result in more aggressive descumming in the subsequent steps (described below).

According to an embodiment of the invention, the next step after the cure step is a descumming process. A descumming process is a process in which an $O_2$ plasma strip is performed at a low power. Descumming is used for removing photoresist. Once a photoresist pattern is applied to a semiconductor wafer, remaining photoresist must be removed from the wafer before the next processing step. In accordance with this embodiment of the invention, the descumming process may be applied to remove not only the residual photoresist, but also the residual pigments from the substrate, without damaging the pigment pattern already applied to the substrate. The substrate is placed in a plasma reactor and the descumming operation is performed for a period of time necessary to remove the residual pigments, but not long enough to damage the pigment pattern on the substrate. The descumming operation includes passing an $O_2$ plasma over the substrate. The $O_2$ plasma gradually strips pigments from the surface of the substrate and is evacuated from the plasma reactor. An exemplary descumming process uses a low power of about 90 watts, and oxygen flow rate of about 4100 sccm, for a duration of about 0.5 minutes.

Figure 2:
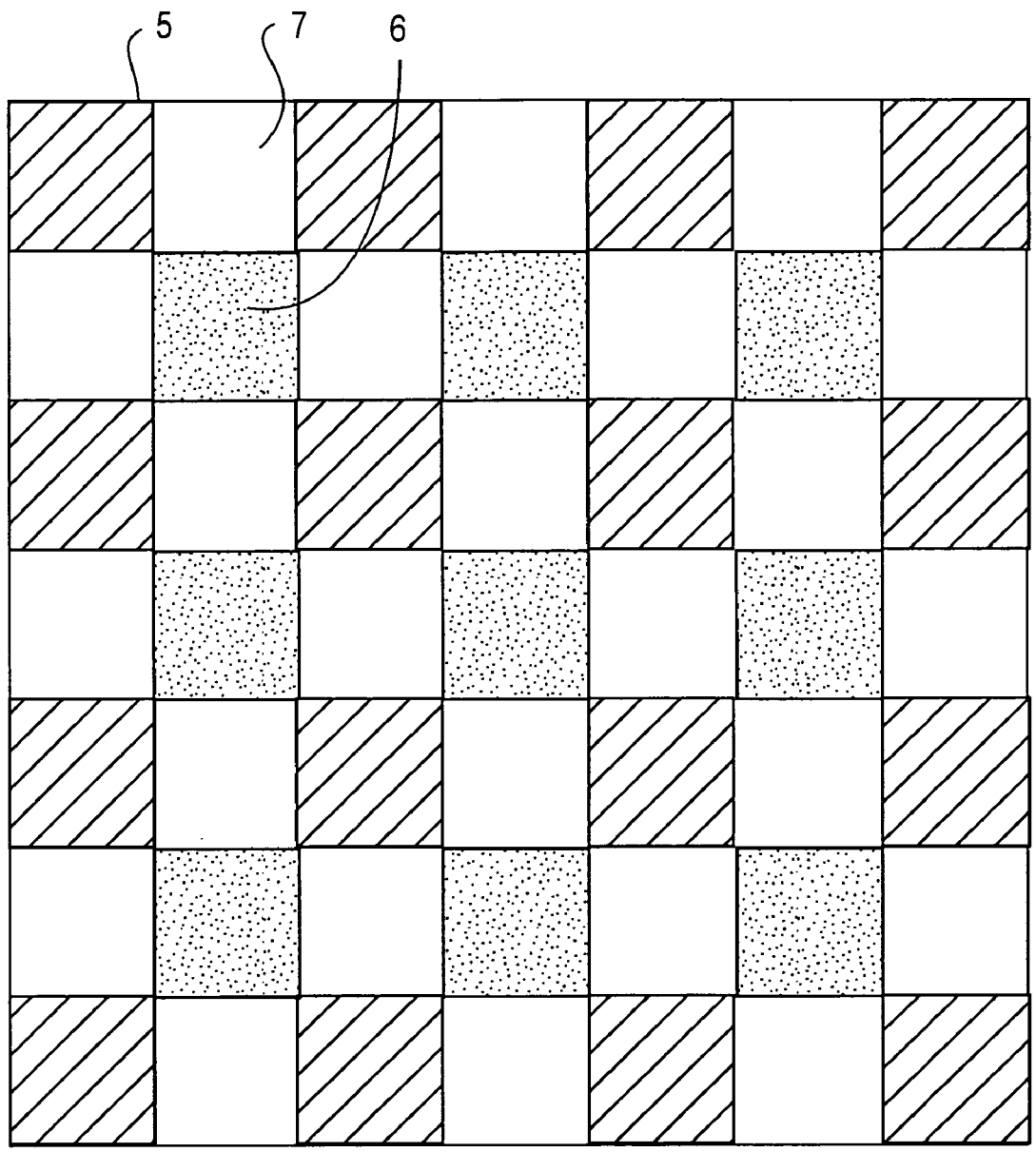
FIG. 2 is an illustration of a color filter array according to an exemplary embodiment of the invention.

FIG. 2 illustrates a Bayer pattern color filter array in a stage of processing subsequent to the descumming step. Photoresist containing red pigments 5 and photoresist containing blue pigments 6 have been deposited, however the photoresist containing blue pigments 6 that remained in green regions 7 after the blue photo process in FIG. 1 are removed such that the photoresist containing green pigments may be deposited in green regions 7 without interference from any photoresist containing blue pigments 6. Other layers and/or microlenses may be formed over the color filter array. For example, a plurality of microlenses may be formed over the color filter array such that each of the plurality of microlenses is formed over each section of the Bayer pattern corresponding to each of a plurality of pixels.

Figure 3:
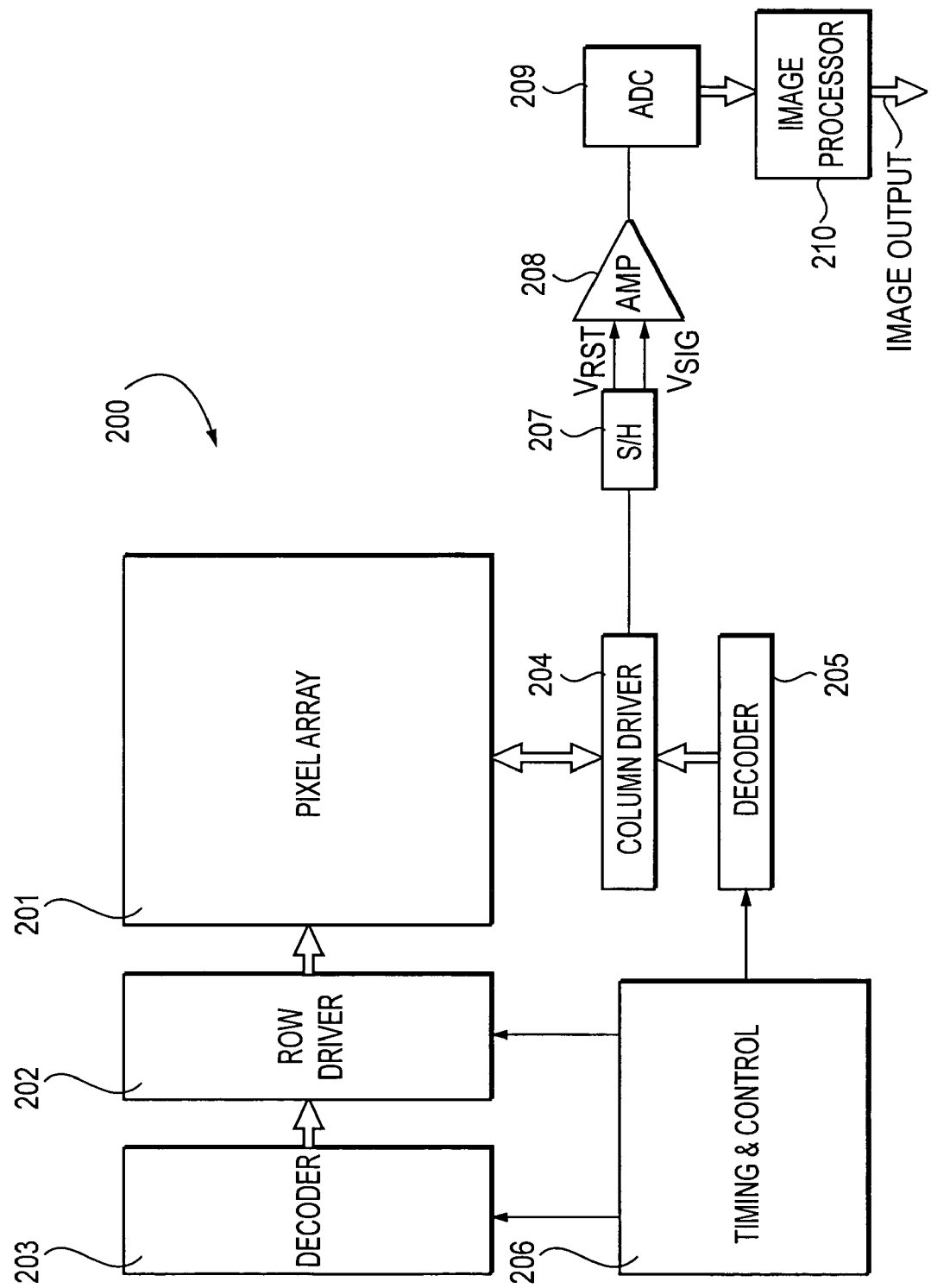
FIG. 3 is a schematic of an imaging device using a pixel having a color filter array constructed in accordance with an embodiment of the invention.

FIG. 3 illustrates an exemplary CMOS imaging device 200 that may utilize a pixel array 201 having a color filter array constructed in accordance with the invention. The imaging device 200 has an imager pixel array 201 comprising a color filter array constructed as described above. Row lines are selectively activated by a row driver 202 in response to row address decoder 203. A column driver 204 and column address decoder 205 are also included in the imaging device 200. The imaging device 200 is operated by the timing and control circuit 206, which controls the address decoders 203, 205. The control circuit 206 also controls the row and column driver circuitry 202, 204.

A sample and hold circuit 207 associated with the column driver 204 reads a pixels reset signal Vrst and a pixel image signal Vsig for selected pixels. A differential signal (Vrst−Vsig) is produced by differential amplifier 208 for each pixel and is digitized by analog-to-digital converter 209 (ADC). The analog-to-digital converter 209 supplies the digitized pixel signals to an image processor 210, which forms and outputs a digital image.

Figure 4:
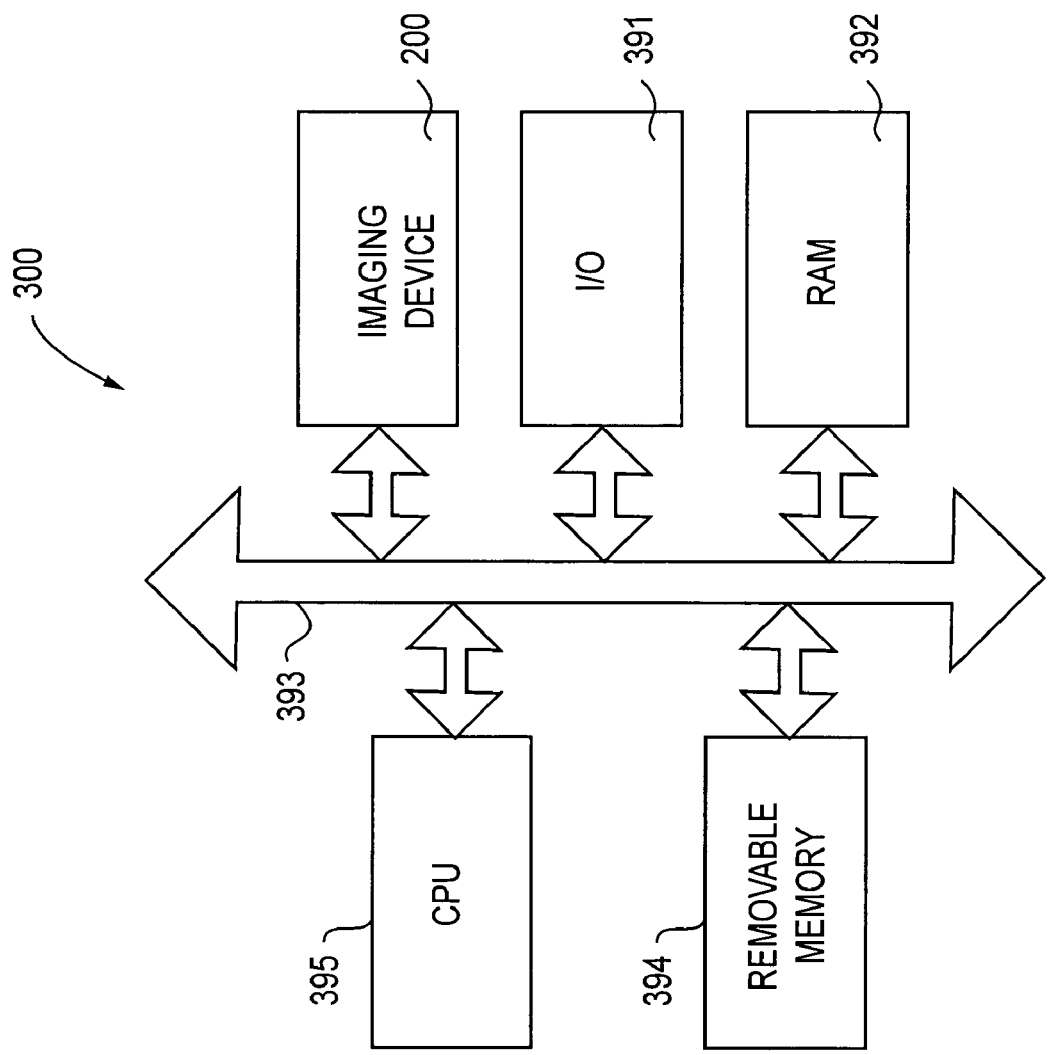
FIG. 4 is a schematic of a processing system including the imaging device of FIG. 3.

FIG. 4 shows system 300, a typical processor system modified to include the imaging device 200 (FIG. 3) of the invention. The processor-based system 300 is exemplary of a system having digital circuits that could include image sensor devices. Without being limiting, such a system could include a computer system, still or video camera system, scanner, machine vision, vehicle navigation, video phone, surveillance system, auto focus system, star tracker system, motion detection system, image stabilization system, and other imaging systems.

The processor-based system 300, for example a camera system, generally comprises a central processing unit (CPU) 395, such as a microprocessor, that communicates with an input/output (I/O) device 391 over a bus 393. Imaging device 200 also communicates with the CPU 395 over the bus 393. The processor-based system 300 also includes random access memory (RAM) 392, and can include removable memory 394, such as flash memory, which also communicate with CPU 395 over the bus 393. Image sensor 200 may be combined with a processor, such as a CPU, digital signal processor, or microprocessor, with or without memory storage on a single integrated circuit or on a different chip than the processor.

Although the above discussion describes the descumming step for fabricating color filter arrays and as being used to remove pigment residue after a second set of pigments is deposited and before a third set of pigments is deposited, it should be noted that the descumming step is not limited to such an embodiment. In other words, the descumming step may be used after a first set of pigments is deposited and before the second set of pigments is deposited. The descumming step may also be used after each set of pigments is deposited.

The descumming process may also be used for post-printing color adjustment. In such an embodiment, the descumming process is applied each time a color pigment is deposited, or a color is printed. The first color pigments, for example the red pigments, are deposited to a greater thickness than the second color pigments, for example the blue pigments, and the second color pigments are deposited to a greater thickness than the third color pigment, for example the green pigments, such that each descumming process thins the three color pigments to have uniform thickness. In another embodiment, the descumming process may be used to control or manipulate the thickness of the color filter array. For example, the descumming process can control the thickness of the color filter array by gradually and uniformly thinning the entire color filter array. In another embodiment, the descumming process may be used to modify the surface of the color filter to be more desirable for the formation of microlens or other layers over the color filter array. For example, the descumming process can smooth out the surface of the color filter array to improve the flow of the microlens material to be deposited on it.

Various applications of the methods of the invention will become apparent to those of skill in the art as a result of this disclosure. Although certain advantages and embodiments have been described above, those skilled in the art will recognize that substitutions, additions, deletions, modifications and/or other changes may be made without departing from the spirit or scope of the invention. Accordingly, the invention is not limited by the foregoing description but is only limited by the scope of the appended claims.

What is claimed as new and desired to be protected by Letters Patent of the United States is:

1. A method of forming a color filter array comprising the acts of:
    forming a first color filter in a first predetermined pattern on a substrate;
    curing said first color filter;
    performing a first descumming operation on said cured first color filter and said substrate; and
    forming a second color filter in a second predetermined pattern on said substrate,
    wherein said first color filter is formed having a first thickness and said second color filter is formed having a second thickness, said first thickness being greater than said second thickness.

2. The method of claim 1, wherein said step of forming the first color filter further comprises the acts of:
    depositing a first color filter material; and
    patterning said first color filter material into said first predetermined pattern, wherein a pigment residue comprising a portion of said first color filter material remains outside of said first predetermined pattern, said first descumming operation removing said pigment residue.

3. The method of claim 1, wherein said first descumming operation comprises an O₂ plasma stripping process.

4. The method of claim 1 further comprising the acts of:
    curing said second color filter after forming said second color filter;
    performing a second descumming operation on the cured first and second color filters and said substrate;
    forming a third color filter in a third predetermined pattern on said substrate; and
    curing said third color filter.

5. The method of claim 4, further comprising performing a third descumming operation on the first, second and third color filters and said substrate.

6. A method of forming a pixel array comprising:
    forming a plurality of pixels on a substrate;
    printing a first color over a first group of pixels;
    curing said first color;
    performing a first descumming process on said first color and said substrate;
    printing a second color over a second group of pixels;
    curing said second color; and
    performing a second descumming process on said first and second colors and said substrates,
    wherein said first color is printed to a first thickness and said second color is printed to a second thickness, said first thickness being greater than said second thickness.

7. The method of claim 6, wherein said first descumming process removes residue from over at least said second group of pixels caused by printing said first color.

8. The method of claim 6, wherein said second descumming process removes residue from over at least said first group of pixels caused by printing said second color.

9. The method of claim 6, wherein said first descumming process thins said first color from said first thickness to a third thickness.

10. The method of claim 9, wherein said second descumming process thins said second color from said second thickness to said third thickness.

11. The method of claim 9, further comprising forming a plurality of microlenses over at least said first and second colors, each of said plurality of microlenses corresponding with each of said plurality of pixels.

12. The method of claim 11, wherein said second descumming process modifies said surface of said substrate before forming said plurality of microlenses.

13. A method of forming an imager structure comprising:
    forming a plurality of pixels formed in a substrate;
    coating said substrate with a photoresist containing colorant;
    patterning said colored photoresist over a group of said plurality of pixels;
    curing said colorant;
    descumming a residue of said colorant material on said group of said plurality of pixels; and
    flowing a microlens material over said colored photoresist to form a plurality of microlenses, wherein said descumming step modifies a surface of said colored photoresist before forming said plurality of microlenses such that said flow of said microlens material is affected.

14. The method of claim 13, wherein said descumming step thins said colored photoresist.

15. The method of claim 13, wherein each of said plurality of microlenses corresponds with each of said plurality of pixels.

16. A method of forming a pixel array comprising:
    forming a plurality of pixels on a substrate;
    printing a first color over a first group of pixels;
    curing said first color;
    performing a first oxygen plasma strip process on said first color and said substrate;
    printing a second color over a second group of pixels;
    curing said second color; and
    performing a second oxygen plasma strip process on said first and second colors and said substrates,
    wherein said first color is printed to a first thickness and said second color is printed to a second thickness, said first thickness being greater than said second thickness.

17. The method of claim 16, wherein said first oxygen plasma strip process removes residue from over at least said second group of pixels caused by printing said first color.

18. The method of claim 16, wherein said second oxygen plasma strip process removes residue from over at least said first group of pixels caused by printing said second color.

19. The method of claim 16 wherein said first oxygen plasma strip process thins said first color from said first thickness to a third thickness.

20. The method of claim 19, wherein said second oxygen plasma strip process thins said second color from said second thickness to said third thickness.

21. The method of claim 16, further comprising forming a plurality of microlenses over at least said first and second colors, each of said plurality of microlenses corresponding with each of said plurality of pixels.

22. The method of claim 21, wherein said second oxygen plasma strip process modifies said surface of said substrate before forming said plurality of microlenses.

* * * * *

UNITED STATES PATENT AND TRADEMARK OFFICE
CERTIFICATE OF CORRECTION

PATENT NO. : 7,326,503 B2
APPLICATION NO. : 11/207814
DATED : February 5, 2008
INVENTOR(S) : Hodge et al.

It is certified that error appears in the above-identified patent and that said Letters Patent is hereby corrected as shown below:

In column 5, line 49, in Claim 6, delete "substrates," and insert -- substrate, --, therefor.

In column 6, line 1, in Claim 11, delete "9," and insert -- 6, --, therefor.

In column 6, line 39, in Claim 16, delete "substrates," and insert -- substrate, --, therefor.

In column 6, line 49, in Claim 19, after "16" insert -- , --.

Signed and Sealed this

Twentieth Day of May, 2008

JON W. DUDAS
*Director of the United States Patent and Trademark Office*